Jan. 30, 1945.  B. D. SMITH  2,368,576
TEAT DILATOR
Filed Sept. 14, 1942

Inventor
BENJAMIN D. SMITH,
By John Howard Joynt
His Attorney.

Patented Jan. 30, 1945

2,368,576

UNITED STATES PATENT OFFICE 2,368,576

TEAT DILATOR

Benjamin D. Smith, Utica, N. Y.

Application September 14, 1942, Serial No. 458,271

1 Claim. (Cl. 128—341)

My invention relates to a medicated dilator for the teats of milch cows.

Among the objects of my invention is the provision of a teat dilator which is simple and economical of construction, which is free of rough, sharp or otherwise injurious surfaces, which is flexible and otherwise suited to conform to the teat, which is capable of absorbing an abundant supply of medicament and of retaining the same over a prolonged period of use, and which is generally well adapted to withstand the varying conditions encountered in actual practical use.

Other objects in part will be obvious and in part pointed out hereinafter.

The invention, accordingly, consists in the combination of elements, features of construction and arrangement of parts and in the several steps and the relation of each of the same to one or more of the others as described herein and shown in the accompanying drawing, the scope of the application of which is indicated in the following claim.

In the accompanying drawing in which corresponding and like parts are designated by the same reference characters.

As conducive to a clearer understanding of certain features of my invention it may be noted at this point that a condition known as "spider and obstruction" frequently develops in the teats of a milch cow and results in impeding or entirely preventing the extraction of milk. The condition has been found to develop from a trauma or mastitis. In the main, it appears that the mucuous membrane lining of the teat canal becomes inflamed. The inflammation, which may be accompanied by a streptococcic infection, usually produces a constriction of the teat canal. This condition, besides being painful, materially impedes the process of milking.

One of the outstanding objects of my invention, accordingly, is the provision of a medicated teat dilator which is highly useful in treating the teats of cows in a safe, reliable manner, which dilator tends to distend the teat canal by reason of the absorption of moisture, and which places soothing and healing medicants in immediate contact with the congested and irritated areas of the teat canal.

Figure 1:
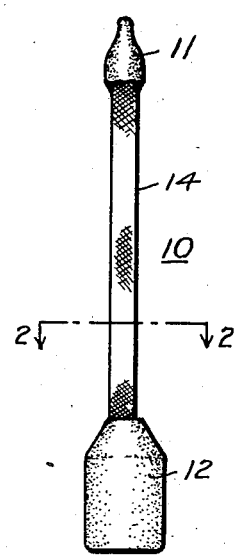
Figure 1 is a side elevation of a teat dilator embodying my invention.
Figure 2:
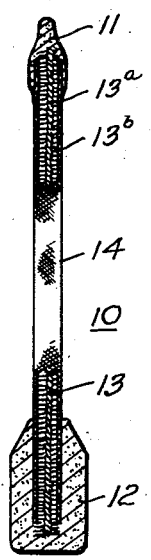
Figure 2 is a broken vertical sectional view of the dilator of Figure 1.
Figure 4:
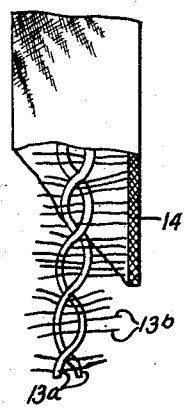
Figure 4 is a broken sectional view, on an enlarged scale, of a portion of the dilator of Fig. 1.
Figure 3:
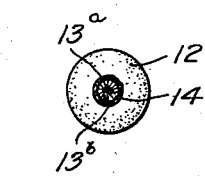
Figure 3 is a horizontal sectional view on the line 2—2 of Figure 1.

Referring now more particularly to the practice of my invention, attention is invited to Figures 1 to 4 inclusive of the drawing wherein there is shown a dilator 10, comprising a longitudinal core 13 including a stem 13a, which is quite flexible, and which, illustratively, is made of small flexible wires spun or inter-twisted together substantially throughout their lengths. Soft absorbent fibrous material 13b, such as strands of cotton or flax spun or twisted between the wires so as to extend radially therefrom, covers and pads the flexible stem 13a. A soft fibrous sleeve 14 made of cotton, flax, or other soft absorbent material, snugly fits over the core 13 and extends substantially to the ends of the core. One end of the core 13, and the corresponding adjacent end of sleeve 14, are joined together under a relatively stiff tip 11. The other end of the dilator has secured thereto a relatively stiff finger-piece or handle 12 which covers and holds together the remaining ends of the core and sleeve. This finger-piece, as well as the tip, may be formed of any suitable material, preferably of a plastic substance, such as beeswax or a mixture of beeswax and coloring matter. The wax, or other material, preferably is applied in melted or liquid condition to the sleeved core so as to ensure proper bond between the ends of the core and sleeve.

My improved teat dilator is soft and resilient and gives maximum comfort in use, particularly where the core portion includes flexible wires spun or twisted around soft fibrous material which finally extends radially from the wires as described hereinbefore. The sleeve portion is soft and is yieldable locally throughout its length by virtue of the underlying tufted fibers of the core. This assures full contact of dilator and the wall of the teat being treated.

Before my dilator is put to use, I treat it with a soothing, healing, and/or sterilizing medicament, such as by immersion in the medicament. Preferably the medicament includes a strong solution either of mercurochrome or iodoform. The soft fibrous material of the core combined with that of the sleeve absorb a plentiful and lasting quantity of the medicament. I then insert the saturated dilator into the teat canal as after milking. The tipped end of the dilator along with the flexible stem facilitate insertion and substantially eliminate danger of puncturing the teat canal.

Among the advantages of this form of dilation and medication are that an abundant supply of medicament is placed in immediate contact with the congested and irritated areas of the teat canal by dilator means which is sufficiently flexible to permit ordinary flexion of the cow's teats without danger of puncturing or injury to the teat wall. The soft, smooth and yieldable sleeved core of the dilator coupled with the flexible core stem ensure thorough medication and improved comfort during dilation.

Thus, it will be seen that there has been provided in my invention a teat dilator in which the objects hereinbefore stated, together with many thoroughly practical advantages, are successfully achieved. It will be seen that with my dilator maximum comfort and thorough and enduring medication are achieved in treating and preventing disorders in the teats of cows.

As many possible embodiments may be made of my invention and as many changes may be made in the embodiment hereinbefore set forth, it will be understood that all matter described herein, or shown in the accompanying drawing, is to be interpreted as illustrative and not in a limiting sense.

I claim:

A teat dilator comprising in combination, a longitudinal core including a stem having wire strands intertwisted throughout their length and fiber strands interposed between the wire strands and projecting radially therefrom, a soft absorbent fibrous sleeve covering said core and extending substantially to the ends thereof, and beeswax tip and handle portions covering the ends of said sleeve and core, said sleeve and core being treated with a medicament including one of the groups consisting of iodoform and mercurochrome.

BENJAMIN D. SMITH.